(12) United States Patent
Esseghir et al.

(10) Patent No.: US 7,842,759 B2
(45) Date of Patent: Nov. 30, 2010

(54) NITROXIDE COMPOUNDS FOR MINIMIZING SCORCH IN CROSSLINKABLE COMPOSITIONS

(75) Inventors: Mohamed Esseghir, Monroe Township, NJ (US); Bharat I. Chaudhary, Princeton, NJ (US); Jeffrey M. Cogen, Flemington, NJ (US); John Klier, Midland, MI (US); Jinder Jow, Singapore (SG); Robert F. Eaton, Belle Mead, NJ (US); Suzanne M. Guerra, Lake Jackson, TX (US)

(73) Assignee: Dow Global Technologies Inc., Midland, MI (US)

( * ) Notice: Subject to any disclaimer, the term of this patent is extended or adjusted under 35 U.S.C. 154(b) by 72 days.

(21) Appl. No.: 12/267,909

(22) Filed: Nov. 10, 2008

(65) Prior Publication Data

US 2009/0069469 A1    Mar. 12, 2009

Related U.S. Application Data (62) Division of application No. 11/539,815, filed on Oct. 9, 2006, now Pat. No. 7,465,769.

(51) Int. Cl.
*C08F 8/30* (2006.01)

(52) U.S. Cl. .................. 525/375; 525/331.3; 525/330.9; 525/387

(58) Field of Classification Search .................. 525/375, 525/331.3, 330.9, 387
See application file for complete search history.

(56) References Cited

U.S. PATENT DOCUMENTS

| 3,202,648 | A | 8/1965 | Latourette et al. |
| 3,335,124 | A | 8/1967 | Larsen |
| 3,751,378 | A | 8/1973 | Cowperthwaite et al. |
| 3,862,107 | A | 1/1975 | MacLeay |
| 3,954,907 | A | 5/1976 | Schober |
| 4,129,531 | A | 12/1978 | Rauer et al. |
| 4,632,950 | A | 12/1986 | Kmiec et al. |
| 6,197,213 | B1 | 3/2001 | Novits et al. |
| 6,555,019 | B2 | 4/2003 | Palys et al. |
| 6,653,409 | B2 | 11/2003 | Ashiura et al. |
| 6,765,058 | B1 | 7/2004 | Novits et al. |
| 2004/0138081 | A1* | 7/2004 | Grimaldi et al. ............ 510/312 |
| 2005/0197457 | A1 | 9/2005 | Chaudhary et al. |

FOREIGN PATENT DOCUMENTS

| EP | 1322696 B1 | 8/2004 |
| GB | 1535039 | 12/1978 |
| WO | 2005063896 A2 | 7/2005 |
| WO | 2005066280 A2 | 7/2005 |
| WO | 2005066282 A2 | 7/2005 |
| WO | WO 2005/066280 | * 7/2005 |

* cited by examiner

*Primary Examiner*—Ling-Siu Choi
(74) *Attorney, Agent, or Firm*—Whyte Hirschboeck Dudek SC (57) ABSTRACT

Scorch is inhibited during the free-radical crosslinking of a crosslinkable polymer, e.g., an EPDM, by incorporating into the polymer before melt processing and crosslinking a scorch inhibiting amount of a derivative, preferably an ether, ester or urethane derivative, of a TEMPO compound, e.g., 4-hydroxy-tetrahydrocarbylpiperidin-1-oxyl. The scorch inhibitors of this invention perform as well, if not better, than their 4-hydroxy-tetrahydrocarbylpiperidin-1-oxyl counterparts in similar polymer compositions and under similar conditions in terms of scorch inhibition and ultimate degree of crosslinking, but exhibit less volatility and less migration within the polymer composition.

3 Claims, 2 Drawing Sheets

NITROXIDE COMPOUNDS FOR MINIMIZING SCORCH IN CROSSLINKABLE COMPOSITIONS

CROSS REFERENCE TO RELATED APPLICATION

This application is a division of U.S. patent application Ser. No. 11/539,815, filed Oct. 9, 2006, now U.S. Pat. No. 7,465,769.

FIELD OF THE INVENTION

This invention relates to crosslinkable compositions. In one aspect, the invention relates to crosslinkable compositions in which crosslinking is initiated by a free radical initiator while in another aspect, the invention relates to the inhibition of premature crosslinking of such crosslinkable compositions. In still another aspect, the invention relates to the use of nitroxides to inhibit such premature crosslinking while in yet another aspect, the invention relates to a method of selecting a nitroxide for use as such an inhibitor.

BACKGROUND OF THE INVENTION

One difficulty in using thermally activated free radical initiators, e.g., organic peroxides and azo compounds, in crosslinking, i.e., curing, elastomeric and thermoplastic materials is that they may initiate premature crosslinking, i.e., scorch, during compounding and/or processing prior to the actual phase in the overall process in which curing is desired. With conventional methods of compounding, such as milling, Banbury, or extrusion, scorch occurs when the time-temperature relationship results in a condition in which the free radical initiator undergoes thermal decomposition which, in turn, initiates a crosslinking reaction that can create gel particles in the mass of the compounded polymer. These gel particles can adversely impact the homogeneity of the final product. Moreover, excessive scorch can so reduce the plastic properties of the material that it cannot be efficiently processed with the likely possibility that the entire batch will be lost.

One widely accepted method for minimizing scorch is to choose a free radical initiator that has a sufficiently high activation temperature so that compounding and/or other processing steps can be successfully completed prior to the final curing step. Typical of this class of initiators are those with a high 10-hour half-life temperature. The disadvantages of this method are longer cure times, and thus lower throughput. Higher cure temperatures can be used to offset the longer cure times, but then higher energy costs are incurred. Higher cure temperatures can also adversely affect the thermal stability of the materials.

Another method of minimizing scorch is to lower the compounding and/or processing temperature to improve the scorch safety margin of the crosslinking agent. This method, however, may have limited scope depending upon the polymer and/or process involved. In addition, here too curing at a lower temperature requires a longer cure time and results in lower throughput. Lower temperatures can also increase the viscosity of the material which in turn can make mixing more difficult, and can increase the risk of running up against the freezing point of the polymer.

Yet another method of minimizing scorch is the incorporation of scorch inhibitors into the compositions, For example, British patent 1,535,039 discloses scorch-resistant compositions comprising organic hydroperoxides and ethylene polymers. U.S. Pat. No. 3,751,378 discloses the use of N-nitroso diphenylamine or N,N'-dinitroso-para-phenylamine as scorch retardants incorporated into a polyfunctional acrylate crosslinking monomer for providing long Mooney scorch times in various elastomer formulations. U.S. Pat. No. 3,202,648 discloses the use of nitrites such as isoamyl nitrite, tert-decyl nitrite and others as scorch inhibitors for polyethylene. U.S. Pat. No. 3,954,907 discloses the use of monomeric vinyl compounds as protection against scorch. U.S. Pat. No. 3,335,124 describes the use of aromatic amines, phenolic compounds, mercaptothiazole compounds, bis(N,N-disubstituted-thiocarbamoyl) sulfides, hydroquinones and dialkyldithiocarbamate compounds. U.S. Pat. No. 4,632,950 discloses the use of mixtures of two metal salts of disubstituted dithiocarbamic acid in which one metal salt is based on copper.

One commonly used scorch inhibitor for use in free radical, particularly peroxide, initiator-containing compositions is 4-hydroxy-2,2,6,6-tetramethylpiperidin-1-oxyl also known as nitroxyl 2, or NR 1, or 4-oxypiperidol, or tanol, or tempol, or tmpn, or probably most commonly, 4-hydroxy-TEMPO or even more simply, h-TEMPO. The addition of 4-hydroxy-TEMPO minimizes scorch by "quenching" free radical crosslinking of the crosslinkable polymer at melt processing temperatures, but it also decreases rate and degree of crosslinking at subsequently elevated (vulcanization) temperatures. Furthermore, 4-hydroxy-TEMPO has a relatively low molecular weight and as such, it is relatively volatile and this can lead to loss during processing and build-up on equipment due to sublimation.

Another problem with this nitroxide scorch inhibitor is its incompatibility with many common polymers that are crosslinked with the help of one or more peroxide initiators. These polymers include ethylene-propylene-diene monomer (EPDM), low density polyethylene (LDPE), linear low density polyethylene (LLDPE), high density polyethylene (HDPE), ethylene vinyl acetate (EVA) with less than about 10 wt % vinyl acetate content, unsaturated acrylates, e.g., methyl, ethyl or butyl acrylate with less than about 10 wt % acrylate content, and the like. As a result of this incompatibility, 4-hydroxy-TEMPO migrates to the surface of a pelleted or sheeted product and can cause handling issues such as dusting, segregation, stickiness and the like. In addition, the product can lose its scorch inhibition efficiency over time, and thus its shelf-life can be compromised. This migration problem usually manifests itself when the nitroxide is blended with the polymer to make a concentrate or masterbatch, and it can also limit the concentration of the nitroxide in a fully formulated product.

SUMMARY OF THE INVENTION

In one embodiment, a thermally activated, free-radical initiator-containing polymer composition of this invention comprises a (i) free radical initiator, (ii) crosslinkable polymer, and (iii) scorch inhibiting amount of a derivative, preferably an ether, ester or urethane derivative, of a tetrahydrocarbylpiperidin-1-oxyl or -alkyloxy (TEMPO) compound that exhibits reduced migration in the composition relative to 4-hydroxy TEMPO under like conditions and, preferably, is also soluble in the crosslinkable polymer. "Under like conditions" and similar terms mean that the only material difference between a composition containing 4-hydroxy TEMPO as a scorch inhibitor and a composition containing a derivative of a TEMPO compound as a scorch inhibitor is the scorch inhibitor itself. All other aspects of the composition and the conditions under which migration are measured, e.g., the crosslinkable polymer and the components of the composition and their respective amounts, temperature, time, etc., are the same or essentially the same.

"Migration" and similar terms mean the movement of a substance from one material to another with which it is in intimate contact, or to the surface of the material in which the substance is incorporated. Under the conditions of forced or stimulated migration, e.g., conditions in which the migrating substance is constantly or periodically removed from the surface of the material in which it is incorporated, most, if not all, incorporated substances will diffuse from the host polymer, e.g., a film or molded product. The driving force for migration, the chemical potential gradient, is related to a variety of factors including solute molar volume, temperature and the like. For the TEMPO derivatives used in the practice of this invention, migration is often driven by solubility of the TEMPO derivatives in the polymer. If a TEMPO solute is below the solubility limit of the polymer, migration is generally reduced.

The scorch inhibitors of this invention perform as well, if not better, than their 4-hydroxy-tetrahydrocarbylpiperidin-1-oxyl counterparts in similar polymer compositions containing similar amounts of similar free-radical initiator and crosslinked under similar conditions in terms of scorch inhibition and ultimate degree of crosslinking, but are generally heavier in molecular weight and are less volatile. In addition, since most, if not all, the scorch inhibitors used in the practice of this invention demonstrate better compatibility with the polymer and other components of the composition, these inhibitors incorporate better into the polymer matrix and thus exhibit better processability (e.g., better mixing with little, if any, phase separation, reduced lubrication, etc., resulting in better compositional homogeneity, higher throughput, etc.) than do their 4-hydroxy-tetrahydrocarbylpiperidin-1-oxyl and -alkyloxy counterparts.

DESCRIPTION OF THE PREFERRED EMBODIMENTS

4-Hydroxy-TEMPO has the chemical structural formula of (I):

The TEMPO compounds from which a derivative, particularly the ether, ester and urethane derivates, can be prepared are of formula (II):

The ether, ester and urethane derivatives of a TEMPO compound that are used as scorch inhibitors in the compositions of this invention have the chemical structural formula of (III):

in which
X of formula II is any group that can react with another compound, e.g., an alcohol, a carboxylic acid, an alkyl sulfate, an isocyanate, etc., to form the ether, ester or urethane group (or corresponding sulfur, phosphorus or amine derivative) of formula III, and preferably X is hydroxyl, amine, mercaptan, phosphino ($H_2P$—), phosphinyl ($H_2P(O)$—) silyl ($H_3Si$—) group, and more preferably X is hydroxyl;
X' of formula III at least a divalent atom, preferably an atom of oxygen, sulfur, nitrogen, phosphorus or silicon, more preferably an atom of oxygen or sulfur and most preferably an atom of oxygen;
and with respect to both formulae II and III
$R_1$-$R_4$ are each independently a $C_{1-12}$ hydrocarbyl group, or any of the $R_1$-$R_4$ groups can join with one or more of the other $R_1$-$R_4$ groups to form one or more hydrocarbyl rings, preferably with at least a 5 carbon atoms;
$R_5$ is an oxyl (O.) or a $C_{1-20}$ hydrocarbyloxy group;
$R_6$ is a hydrogen or $C_{1-12}$ hydrocarbyl or carboxyl group, or a urethane group of the formula With the proviso that if the $R_1$-$R_4$ groups are methyl, then $R_6$ is not hydrogen; and
$R_7$ is a $C_{2-30}$ hydrocarbyl group.

As here used, "ether, ester and urethane derivatives" are the compounds of formula III in which X' is a divalent oxygen radical. The hydrocarbyl groups of $R_1$-$R_7$ include, but are not limited to, alkyl, aryl, aralkyl, cycloalkyl, alkenyl, and the like. Preferably, $R_1$-$R_4$ are each independently a $C_{1-4}$ alkyl group and more preferably, $R_1$-$R_4$ are each independently methyl groups. Preferably $R_5$ is an oxyl or a $C_{1-12}$ alkyloxy group, and more preferably an oxyl group. Preferably $R_6$ is a $C_{1-12}$ alkyl, or a $C_{1-12}$ alkyl carboxyl or an aryl carboxyl group, or a urethane group, and more preferably a $C_{1-8}$ alkyl group, or benzoic acid group, or a urethane group. Preferably $R_7$ is a $C_{5-30}$ alkyl group, more preferably a $C_{5-20}$ alkyl group. Representative ether and urethane derivatives of 4-hydroxy-TEMPO include methyl ether TEMPO, butyl ether TEMPO, hexyl ether TEMPO, allyl ether TEMPO and stearyl urethane TEMPO.

The scorch inhibitors of this invention exhibit reduced migration in the polymer compositions in which they are mixed relative to 4-hydroxy-TEMPO in a like polymer composition and under like conditions. For example and in the context of the migration study reported in Table 4 of the Specific Embodiments, "reduced migration" means that less than about 50, preferably less than about 40, more preferably less than about 30, even more preferably less than about 20 and still more preferably less than about 10, milligrams per 100 milliliters of solvent, of the scorch inhibitor migrates out of the composition.

The scorch inhibitors of this invention preferably also exhibit about the same or greater solubility than 4-hydroxy-TEMPO in like polymers under like conditions, e.g., ambient conditions. Solubility is measured as described in the Specific Embodiments, Section C, Solubility.

The scorch inhibitors of this invention are used in the same manner and amount as known scorch inhibitors, particularly 4-hydroxy-TEMPO. The preferred amount of scorch inhibitor used in the compositions of this invention will vary with its molecular weight and the amount and nature of the other components of the composition, particularly the free radical initiator, but typically the minimum amount of scorch inhibitor used in a system of LDPE with 1.7 weight percent (wt %) peroxide is at least about 0.01, preferably at least about 0.05, more preferably at least about 0.1 and most preferably at least about 0.15, wt % based on the weight of the polymer. The maximum amount of scorch inhibitor can vary widely, and it is more a function of cost and efficiency than anything else. The typical maximum amount of scorch inhibitor used in a system of LDPE with 1.7 wt % peroxide does not exceed about 2, preferably does not exceed about 1.5 and more preferably does not exceed about 1, wt % based on the weight of the polymer.

The scorch inhibitor of this invention is admixed with the crosslinkable elastomeric and/or thermoplastic polymeric systems by employing conventional compounding means including, but not limited to, spraying, soaking and melt compounding. The scorch inhibitor can be blended into the composition directly or formulated with one or more other components of the composition before addition to the other components of the composition. In one preferred embodiment, the scorch inhibitor is formulated with the crosslinkable polymer to form a masterbatch, and then the masterbatch is melt blended with the remainder of the polymer to form a homogeneous composition.

Free radical crosslinking processes for crosslinkable polymers are well known in the art, and are well described generally in PCT applications WO 2005/063896, WO 2005/066280 and WO 2005/066282, all incorporated herein by reference. The thermoplastic and/or elastomeric polymers encompassed in the present invention are those natural or synthetic polymers which are thermoplastic and/or elastomeric in nature, and which can be crosslinked (cured) through the action of a crosslinking agent. Rubber World, "Elastomer Crosslinking with Diperoxyketals," October, 1983, pp. 26-32, Rubber and Plastic News, "Organic Peroxides for Rubber Crosslinking," Sep. 29, 1980, pp. 46-50, and the PCT publications cited above all describe the crosslinking action and representative crosslinkable polymers. Polyolefins suitable for use in this invention are also described in the above PCT applications and in Modern Plastics Encyclopedia 89 pp 63-67, 74-75. Illustrative polymers include LLDPE, LDPE, HDPE, medium density polyethylene, ultralow density polyethylene, chlorinated polyethylene, ethylene-propylene terpolymers (e.g., ethylene-propylene-butadiene), polybutadiene, styrene-acrylonitrile (SAN), acrylonitrile-butadiene-styrene (ABS), ethylene vinyl acetate (EVA), ethylene-propylene copolymers (EP), silicone rubber, chlorosulfonated polyethylene, fluoroelastomers and the like.

In addition, blends of two or more polymers may be employed. The polymers described above and the crosslinkable compositions prepared from these polymers may contain various other additives known to those skilled in the art including, but not limited to, fillers such as carbon black, titanium dioxide, and the alkaline earth metal carbonates, and monomeric co-agents such as triallylcyanurate, allyldiglycolcarbonate, triallylisocyanurate, trimethylolpropane, diallylether, trimethylolpropane trimethacrylate, and various allylic compounds. Methacrylate and acrylate compounds may also be added separately to the various polymers identified above. The crosslinkable compositions of this invention may also contain such conventional additives as antioxidants, stabilizers, plasticizers, processing oils and the like.

The free radical initiators used in the practice of this invention include any thermally activated compound that is relatively unstable and easily breaks into at least two radicals. Representative of this class of compounds are the peroxides, particularly the organic peroxides, and the azo initiators. Of the free radical initiators used as crosslinking agents, the dialkyl peroxides and diperoxyketal initiators are preferred. These compounds are described in the Encyclopedia of Chemical Technology, 3rd edition, Vol. 17, pp 27-90. (1982).

In the group of dialkyl peroxides, the preferred initiators are: dicumyl peroxide, di-t-butyl peroxide, t-butyl cumyl peroxide, 2,5-dimethyl-2,5-di(t-butylperoxy)-hexane, 2,5-dimethyl-2,5-di(t-amylperoxy)-hexane, 2,5-dimethyl-2,5-di(t-butylperoxy)hexyne-3, 2,5-dimethyl-2,5-di(t-amylperoxy)hexyne-3, α,α-di[(t-butylperoxy)-isopropyl]-benzene, di-t-amyl peroxide, 1,3,5-tri-[(t-butylperoxy)-isopropyl]benzene, 1,3-dimethyl-3-(t-butylperoxy)butanol, 1,3-dimethyl-3-(t-amylperoxy)butanol and mixtures of two or more of these initiators.

In the group of diperoxyketal initiators, the preferred initiators are: 1,1-di(t-butylperoxy)-3,3,5-trimethylcyclohexane, 1,1-di(t-butylperoxy)cyclohexane n-butyl, 4,4-di(t-amylperoxy)valerate, ethyl 3,3-di(t-butylperoxy)butyrate, 2,2-di(t-amylperoxy)propane, 3,6,6,9,9-pentamethyl-3-ethoxycarbonylmethyl-1,2,4,5-tetraoxacyclononane, n-butyl-4,4-bis(t-butylperoxy)-valerate, ethyl-3,3-di(t-amylperoxy)-butyrate and mixtures of two or more of these initiators.

Other peroxide initiators, e.g., 00-t-butyl-0-hydrogen-monoperoxysuccinate; 00-t-amyl-0-hydrogen-monoperoxysuccinate and/or azo initiators e.g., 2,2'-azobis-(2-acetoxypropane), may also be used to provide a crosslinked polymer matrix. Other suitable azo compounds include those described in U.S. Pat. Nos. 3,862,107 and 4,129,531. Mixtures of two or more free radical initiators may also be used together as the initiator within the scope of this invention. In addition, free radicals can form from shear energy, heat or radiation.

The amount of crosslinking agent present in the crosslinkable compositions of this invention can vary widely, but the minimum amount is that sufficient to afford the desired range of crosslinking. The minimum amount of initiator is typically at least about 0.02, preferably at least about 0.05 and more preferably at least about 0.1, wt % based upon the weight of the polymer or polymers to be crosslinked. The maximum amount of initiator used in these compositions can vary widely, and it is typically determined by such factors as cost, efficiency and degree of desired crosslinking desired. The maximum amount is typically less than about 20, preferably less than about 15 and more preferably less than about 10, wt % based upon the weight of the polymer or polymers to be crosslinked.

For some applications, the use of liquid or neat free radical initiator is desirable or even required. One such application is in extrusion compounding. One common commercial process technique employs liquid initiator which is sprayed onto polymer pellets or granules to coat them prior to extrusion compounding. This can provide increased production efficiency and eliminates physical handling of hazardous compounds.

The crosslinkable composition may be heat cured to a time sufficient to obtain the desired degree of crosslinking. The heat curing has a temperature-time relationship which is primarily dependent on the polymeric compound and the peroxide initiator present, but that relationship may be affected by other ingredients in the formulation. The customary cure time is typically about 3 to 8 half-lives of the initiator, but this may be varied based on experience at the option of the operator and the exact properties desired in the final product.

The crosslinking (curing) temperature is typically between about 100 and about 300 C or more. The cure time is inversely related to the temperature. Compositions employing the preferred initiators heat cure at a temperature-time relation of about 120 to about 200 C and about 0.5 to about 30 minutes. The heat cure may be carried out in any conventional fashion such as mold cures, oil bath cures (where oil does not harm the polymeric compound), oven cures, steam cures, and hot metal salt bath cures.

The compositions of this invention are further described by the following examples, and the data relates to the performance of the various nitroxides on cure control, migration and solubility. Unless otherwise noted, all parts and percentages are by weight.

SPECIFIC EMBODIMENTS

A. Cure Control: Inhibition of Premature Crosslinking

The crosslinkable polymer resins are Nordel™ IP3722 (18 Mooney viscosity, 0.55 wt % 5-ethylidene-2-norbornene (ENB), and 70.5 wt % ethylene) and IP4640 EPDM (40 Mooney viscosity, 4.9 wt % 5-ethylidene-2-norbornene (ENB), and 55 wt % ethylene), both resins from DuPont Dow Elastomers (now The Dow Chemical Company), and LDPE pellets (MI of 2 dg/min and a density of 0.92 g/cc and containing 0.6 wt % of a processing aid/phenolic anti-oxidant mixture. The scorch inhibitors are identified in Tables 1-3.

Liquid @ RT means that the scorch inhibitor is liquid at room temperature. Mooney viscosity is determined by the method of ASTM D-1646, percent ENB by method ASTM D-6047 and percent ethylene by method ASTM D-3900.

Sample Preparation

Each EPDM resin is first loaded into a laboratory scale (45 grams) Brabender mixer, and then the other additives (peroxide, etc.) are added and mixed for 5 minutes at 35 rpm and 90 C. The mixture is then removed and pressed into a sheet before cooling down.

For the LDPE resin, first the peroxide is melted separately at 60 C using a water bath, and then it is soaked into the polymer pellets. The soaking procedure is as follows: The polymer pellets are heated in a glass jar at 60 C for 4 hours. The melted peroxide is then added to the pellets using a syringe and tumble blended for 5 minutes while the pellets are hot. The jar containing the polymer pellets with peroxide is then placed in an oven at 60 C for a minimum of 3 hours. The peroxide soaked pellets are then used to make about 40 grams of the various compositions in a melt-compounding step using a Brabender mixing bowl. The pellets are loaded into the bowl and mixed at 35 rpm and 120 C until molten. The TEMPO-derivative scorch inhibitor is then added and further mixed for additional 4 minutes at the same set temperature and speed conditions.

Testing for Cure Performance:

Samples are cut from the sheets prepared in the previous step, and then placed into a rheometer chamber for cure, i.e., crosslinking, performance analysis. The rheometer chamber is an MDR 2000 from Alpha Technologies, and the analysis is performed according to the procedure of ASTM D5289.

To determine scorch inhibition characteristics for the EPDM compositions, the MDR is run at 140 C for 30 minutes and both $ts_{0.1}$ (the time in minutes for the torque to move above the minimum or baseline torque value by 0.1 inch/pounds (in/lb)) and $ts_t$ (the time in minutes for the torque to move above the minimum or baseline torque value by 1 in/lb) are obtained. To measure the cure characteristics, the apparatus is run at 177 C for 12 minutes, and the maximum torque response (MH) and the minimum torque (ML) are obtained. The results are reported in Tables 1 and 2. All percentages are by weight. ML is the minimum value of crosslinking recorded, and MH is the highest value of crosslinking recorded.

To determine scorch inhibition characteristics for the LDPE compositions, the cross-linking kinetics of the compositions are also investigated using the MDR but at 150 C for 60 minutes (to simulate melt processing conditions under which scorch is not desirable) and at 182 C for 12 minutes (to simulate vulcanization conditions in which rapid and effective crosslinking are desirable). The results are reported in Table 3. Here too, all percentages are by weight, and the polymer weight includes the processing aid/anti-oxidant mixture. ML is the minimum value of crosslinking recorded, and MH is the highest value of crosslinking recorded.

TABLE 1

MDR Data for Nordel IP3722 EPDM

| EPDM (Nordel IP3722) | 98.68 | 98.43 | 98.41 | 98.30 | 98.35 | 98.31 |
|---|---|---|---|---|---|---|
| DicupR (Dicumyl Peroxide from Geo Specialty Chemicals) | 1.32 | 1.32 | 1.32 | 1.32 | 1.32 | 1.32 |
| 4-hydroxy TEMPO (Mw: 172.3; mp: 67 C.) | | 0.25 | | | | |
| Methyl Ether TEMPO (Mw: 186; mp: 40-44 C.) | | | 0.27 | | | |
| Benzyl Ester TEMPO (Mw: 262; mp: 66 C.) | | | | 0.38 | | |

TABLE 1-continued

MDR Data for Nordel IP3722 EPDM

| EPDM (Nordel IP3722) | 98.68 | 98.43 | 98.41 | 98.30 | 98.35 | 98.31 |
|---|---|---|---|---|---|---|
| Butyl Ether TEMPO (Mw: 228; liquid @ RT) | | | | | 0.33 | |
| Hexyl Ether TEMPO (Mw: 256; liquid @ RT) | | | | | | 0.37 |
| MDR @ 140 C. | | | | | | |
| ts0.1 (min) | 2.7 | 15.0 | 18.3 | 18.3 | 15.7 | 18.3 |
| ts1 (min) | 12.67 | >30 | >30 | >30 | >30 | >30 |
| MDR @ 177 C. | | | | | | |
| ML (in-lb) | 0.45 | 0.4 | 0.4 | 0.39 | 0.39 | 0.35 |
| MH (in-lb) | 9.31 | 7.13 | 7.7 | 6.9 | 7.14 | 8.67 |
| MH − ML (in-lb) | 8.86 | 6.73 | 7.3 | 6.51 | 6.75 | 8.32 |

TABLE 2

MDR Data for Nordel IP4640 EPDM

| EPDM (Nordel IP4640) | 98.68 | 98.43 | 98.41 | 98.35 | 98.31 |
|---|---|---|---|---|---|
| DicupR (Dicumyl Peroxide from Geo Specialty Chemicals) | 1.32 | 1.32 | 1.32 | 1.32 | 1.32 |
| 4-hydroxy TEMPO (Mw: 172.3; mp: 67 C.) | | 0.25 | | | |
| Methyl Ether TEMPO (Mw: 186; mp: 40-44 C.) | | | 0.27 | | |
| Butyl Ether TEMPO (Mw: 228; liquid @ RT) | | | | 0.33 | |
| Hexyl Ether TEMPO (Mw: 256; liquid @ RT) | | | | | 0.37 |
| MDR @ 140 C. | | | | | |
| ts0.1 (min) | 3.3 | 20.0 | 18.7 | 22.0 | 18.3 |
| ts1 (min) | 13 | >30 | >30 | >30 | >30 |
| MDR @ 177 C. | | | | | |
| ML (in-lb) | 0.94 | 0.82 | 0.81 | 0.82 | 0.82 |
| MH (in-lb) | 14.91 | 12.48 | 13.98 | 12.46 | 12.33 |
| MH − ML (in-lb) | 13.97 | 11.66 | 13.17 | 11.64 | 11.51 |

TABLE 3

MDR Data for LDPE

| LDPE | 98.20 | 97.80 | 97.77 | 97.71 | 97.67 | 97.61 |
|---|---|---|---|---|---|---|
| VCP-R Peroxide (VulCup peroxide from Geo Peroxy Chemicals) | 1.8 | 1.8 | 1.8 | 1.8 | 1.8 | 1.8 |
| 4-hydroxy TEMPO (Mw: 172.3; mp: 67 C.) | | 0.40 | | | | |
| Methyl Ether TEMPO, (Mw: 186; mp: 40-44 C.) | | | 0.43 | | | |
| Allyl Ether TEMPO, (Mw: 212; liquid @ RT) | | | | 0.49 | | |
| Butyl Ether TEMPO, (Mw: 228; liquid @ RT) | | | | | 0.53 | |
| Hexyl Ether TEMPO, (Mw: 256; liquid @ RT) | | | | | | 0.59 |
| MDR @ 150 C. | | | | | | |
| ts0.1 (min) | 7.5 | 14.5 | 17.0 | 12.0 | 14.5 | 16.5 |
| ts1 (min) | 25.3 | 41.8 | 40.8 | 29.0 | 37.7 | 44.2 |
| MDR @ 182 C. | | | | | | |
| ML (in-lb) | 0.19 | 0.16 | 0.16 | 0.16 | 0.16 | 0.16 |
| MH (in-lb) | 5.05 | 4.13 | 4.35 | 4.97 | 4.24 | 3.94 |
| MH − ML (In-lb) | 4.86 | 3.97 | 4.19 | 4.81 | 4.08 | 3.78 |

B. Migration Studies

Sample Preparation

For each composition, first the EPDM resin is loaded into a laboratory scale (45 grams) Brabender mixer, and then the TEMPO compound is added and mixed for 5 minutes at 35 rpm and 90 C. The mixture is then removed and pressed into a mold to make plaques 89 mm×44 mm×4 mm in size. The plaque surface area is approximately 89 cm² and the plaque weight is about 13 g. Any nitroxide present on the plaque's surface is instantly dissolved in acetonitrile. The level of nitroxide formation on the surface of plaque samples is determined by high pressure liquid chromatography (HPLC) analysis.

Procedure
1. Fill a 200 ml crystallization dish with about 80 ml HPLC grade acetonitrile.
2. The whole surface of the plaque is washed with acetonitrile by immersing the sample in the solvent.

3. The solvent is wiped of the surface and the dried sample is placed into a PE bag such that the surface of the sample is not in contact with the interior surface of the bag.
4. The plaque is stored at ambient temperature, and each plaque is inspected periodically. The same plaque sample is washed with acetonitrile at each specified interval, and the collection from each washing combined with the collection from all of the other washings from that sample. The cumulative amount of scorch inhibitor collected from a particular sample is report in Table 4 in milligrams of inhibitor per 100 ml of solvent.
5. After each wash, the solution is carefully transferred from the crystallization dish into an 100 ml volumetric flask, and the flask is filled with acetonitrile up to 100 ml.
6. The high pressure liquid chromatography (HPLC) analysis of the solution of Step 5 uses the following conditions:

| Instrument: | Agilent 1100 Series | |
|---|---|---|
| Mobile phase: | H$_2$O/CAN | |
| Column: | AquaSil C-18; 2.1 × 100 mm, 5 um | |
| Gradient: | Time (min) | % B |
| | 0 | 50 |
| | 3 | 50 |
| | 5 | 100 |
| | 8 | 100 |
| | 10 | 50 |
| | 15 | 50 |
| Total time run: | 25 min | |
| Post Time: | 10 min | |
| Signal: | 240 nm, 16; ref: 360, 40 | |
| Flow: | 0.30 ml/min | |
| Oven Temp.: | 40° C. | |
| Injection: | 5 μl | |

HPLC results are in mg per 100 milliliters. AquaSil C-18 columns acquired from Thermo Electron Corporation of Waltham, Mass. The data are reported in Table 4.

The propyl ester, acetyl and benzyl ester TEMPO-derivatives are comparative examples. These materials demonstrate high migration relative to Nordel IP3722 EPDM. The other TEMPO-derivative scorch inhibitors, however, exhibit little migration from the EPDM polymer.

C. Solubility

The solubility of TEMPO derivatives is measured by weighing a rectangular polymer sample (approximately 40 mils thick) on an analytical balance to the nearest 0.1 mg (tare weight). Polymer samples are typically 1-3 g. Samples are then immersed in the liquid TEMPO derivative sample for about 1-16 weeks. Samples are removed from the liquid TEMPO derivative, blotted to remove surface liquid, and weighed on an analytical balance. Periodic weighing is continued until equilibrium TEMPO derivative uptake is reached. Weight fraction TEMPO derivative uptake is calculated as: 100×(total weight of polymer with TEMPO at Time t−original weight of polymer)/(total weight of polymer with TEMPO at time t).

For solid TEMPO derivatives, the tare weight polymer sample is suspended in a closed container above the solid TEMPO derivative. Samples are weighed on an analytical balance periodically to determine TEMPO derivative uptake.

For above or below ambient temperature solubility, a similar method is used. The TEMPO samples and polymers are put in small, e.g., about one-half pint, jars. The jars containing the TEMPO/polymer samples are placed in either a temperature controlled oven or refrigerator/freezer. The results are reported in Table 5 and the last column of Table 4, and these results demonstrate that these different structures have different solubilities. These results also demonstrate that high melting point TEMPO-derivatives have low solubility at ambient conditions, and are thus prone to migration out of the polymer.

TABLE 4

Migration* and Equilibrium Solubility of TEMPO Structures in Nordel IP3722 EPDM

| Scorch Inhibitor | Storage Period (days) | Concentration of TEMPO in EPDM polymer (wt %) | Day 0 mg/100 ml of Solvent | Day 1 mg/100 ml of Solvent | Day 2 mg/100 ml of Solvent | Day 7 mg/100 ml of Solvent | Day 8 mg/100 ml of Solvent | Day 14 mg/100 ml of Solvent | Day 21 mg/100 ml of Solvent | Equilibrium Solubility in EPDM wt % @ 25 C. |
|---|---|---|---|---|---|---|---|---|---|---|
| 4-Hydroxy TEMPO | 14 | 5 | n/d | 21.6 | n/d | 39.9 | n/d | 52.1 | n/d | 0.38 |
| Methyl Ether TEMPO | 15 | 5 | n/d | n/d | 5.5 | 7.5 | n/d | 9.9 | n/d | 5.26 |
| Butyl Ether TEMPO | 14 | 5 | 1.9 | 3.9 | n/d | 5.7 | n/d | 7.7 | n/d | 22.2 |
| Hexyl Ether TEMPO | 21 | 5 | 1.9 | n/d | n/d | 3.4 | n/d | n/d | 5.4 | 26.7 |
| Allyl Ether TEMPO | 15 | 5 | n/d | n/d | 2.2 | n/d | 3.8 | 5.0 | n/d | 7.2 |
| Propyl Ester TEMPO | 14 | 6.2** | 63.1 | n/d | 97.0 | 106.9 | n/d | 114.4 | n/d | 1.96 |
| Acetyl TEMPO | 14 | 6.6** | 56.0 | n/d | 102.6 | 135.8 | n/d | 163.2 | n/d | 2.23 |
| Benzyl Ester TEMPO | 14 | 5 | 10.8 | 56.2 | n/d | 116.4 | n/d | 123.6 | n/d | n/d | n/d—not determined
*Concentration levels in washed solvent as determined by HPLC. Values shown are cumulative for each wash period.
**Molar equivalent of 4-h-TEMPO

TABLE 5

Solubility Data

| Temp. (C.) | H-TEMPO | Oxo | Methoxy | Allyloxy | Butoxy | Hexoxy | Acetate | Propionate | $C_{16}$ Ester | Oleate | Stearyl urethane TEMPO | Meth-acrylate |
|---|---|---|---|---|---|---|---|---|---|---|---|---|
| −13 |  |  |  |  |  |  | 2.4 |  |  |  |  |  |
| 0 |  |  | 1.36 |  | 10.6 |  |  |  |  |  |  |  |
| 25 | 0.38 |  | 5.26 | 7.2 | 22.2 | 26.7 | 2.23 | 1.96 |  | 11.8 |  | 0.63 |
| 38 |  |  | 17.5 |  |  |  |  |  |  |  |  |  |
| 50 | 0.69 | 5.7 | 27.4 | 13.8 | 38.7 | 54.9 |  |  | 50.2 |  |  |  |
| 65 | 1.17 | 4.6 | 31.01 | 15.6 | 55.6 | 70.7 | 12.5 | 17.1 | 65.6 | 29.2 | 11.7 | 8.39 |
| 75 | 1.42 | 7.85 | 35.3 |  |  |  | 14.9 | 22.2 |  |  |  |  |

D. Scorch and Cure Control

The following TEMPO derivatives are evaluated: 4-hydroxy TEMPO, amino-TEMPO (4-Amino-2,2,6,6-Tetramethylpiperidino-oxy), allyl ether TEMPO and stearyl urethane TEMPO.

The stearyl urethane TEMPO is prepared as 1:1 molar mixture of 4-hydroxy-TEMPO, stearyl isocyanate with approximately 0.1% of dibutyltin dilaurate (DBTDL) as catalyst. The reactants are melted at 80 C and 0.1% by weight of the appropriate catalyst is added to the 4-hydroxy-TEMPO, mixed on a vortex mixer, and reheated for about 1 minute. The two liquids are then poured together, mixed on a vortex mixer, and the reaction allowed to proceed to completion at 130 C. An aliquot is used for the analysis, and spectra are collected on a Nicolet Magna 750 FT-IR spectrometer via transmission. The samples are prepared as capillary films pressed between salts. The salts are then placed in a heatable cell holder connected to a digital temperature controller. Resolution is set at 4 cm$^{-1}$ and 64 scans are co-added to enhance the signal to noise (s/n) ratio. The spectra are processed with triangular apodization.

Figure 1:
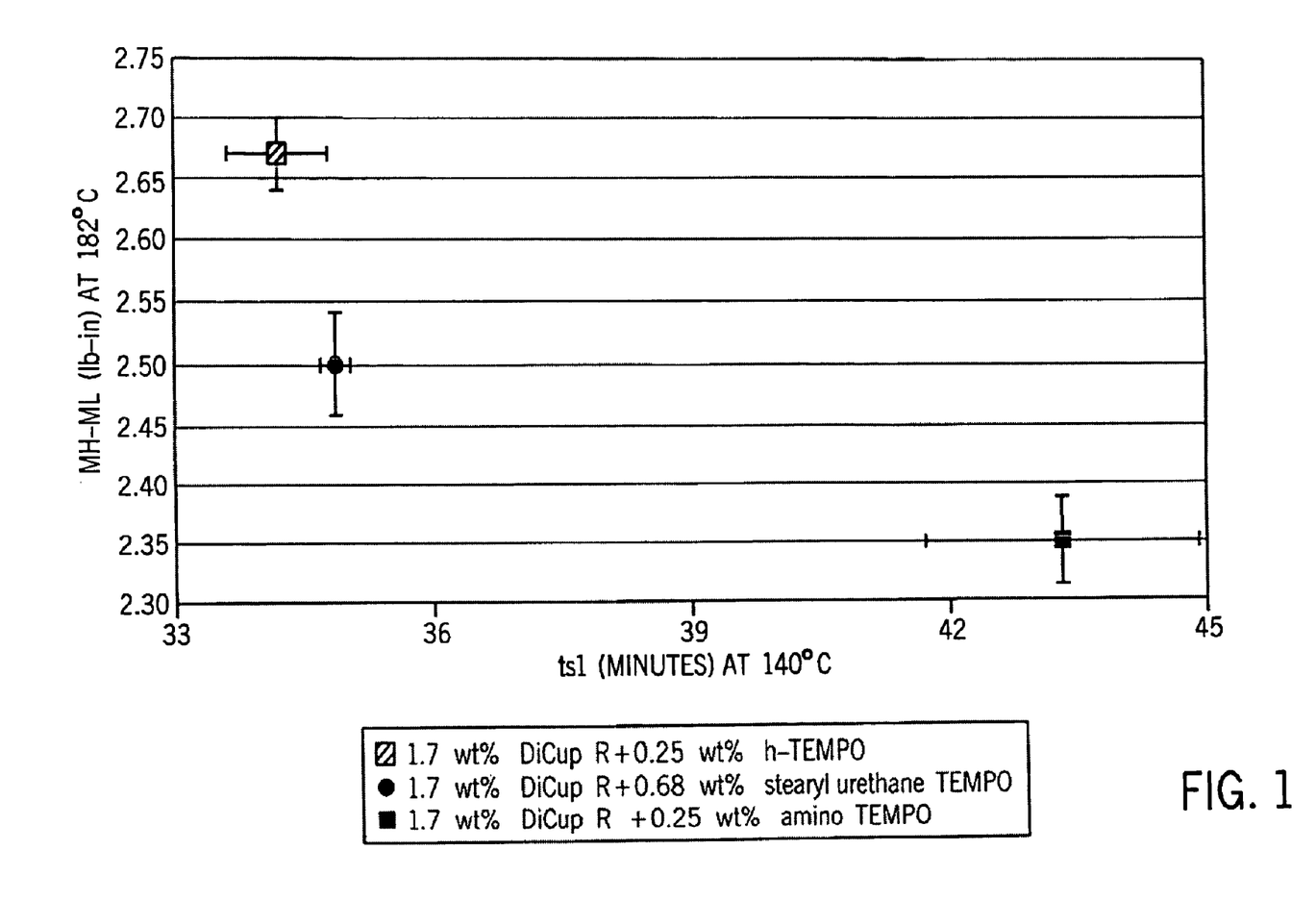
FIG. 1 is a graph reporting the effect of various TEMPO derivatives on the balance of scorch characteristics and degree of crosslinking in an LDPE.

Examples of FIG. 1

The resin used is a low density polyethylene (2.4 dg/min melt index (MI), 0.9200 g/cc density). The peroxide is soaked into pellets of polymer according to the following procedure:

Heat the LDPE pellets in a glass jar at 60 C for 2 hours.

Preheated DiCupR peroxide (dicumyl peroxide, DCP) separately to 60 C, i.e., above its melting point of 40 C.

Add preheated peroxide using a syringe and tumble blend for 30 minutes at room temperature.

Place the jar back in the oven at 60 C overnight.

Mix the entire contents of the jar in a Brabender mixing bowl at 125 C and 30 rpm for 10 minutes.

The TEMPO derivatives are added according to the following procedure:

1. A Brabender mixing bowl is used at 30 rpm to make 40 grams of each formulation.
2. The mixing bowl is not purged with nitrogen.
3. The LDPE-containing peroxide is added and fluxed for 3 minutes at 125 C.
4. TEMPO is added and mixed for an additional 7 minutes at 125 C.

The crosslinking kinetics of the blends is investigated using MDR at 140 C (to simulate melt processing conditions where scorch is not desirable) and at 182 C (to simulate vulcanization conditions in which rapid and effective crosslinking are desirable). The results are presented in FIG. 1. In comparison with 4-hydroxy-TEMPO:

1. Stearyl urethane TEMPO desirably increases scorch time, i.e., the time for 1 in-lb increase in torque, ts1 at a temperature of 140 C with only a slight decrease in degree of crosslinking (Maximum Torque, MH, minus Minimum Torque, ML) at 182 C; and
2. Amino-TEMPO increases the degree of crosslinking at 182 C, but also decreases scorch protection at 140 C.

Figure 2:
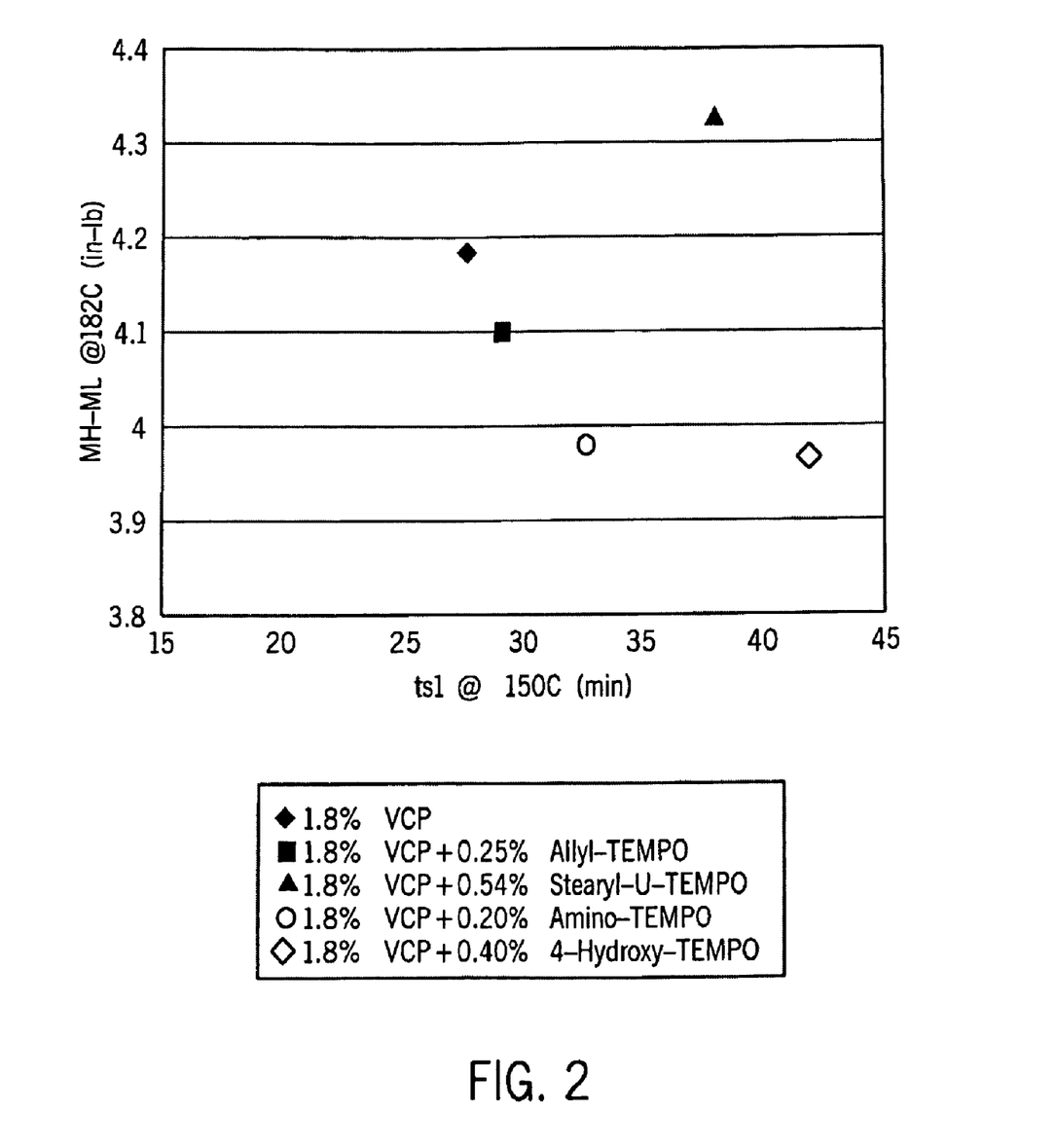
FIG. 2 is a graph reporting the effect of various TEMPO derivatives on the balance of scorch characteristics and degree of crosslinking in an LDPE containing a processing aid and an antioxidant.

Examples of FIG. 2

The resin used is a pelleted compound of LDPE (2.0 dg/min MI, 0.9200 g/cc density) containing 0.6% processing aid/phenolic anti-oxidant mixture. The peroxide used is Vul-Cup available from Geo Peroxy Chemicals Group, chemical name: a,a'-bis(tert-butylperoxy)-diisopropylbenzene).

Sample Preparation:

First, the peroxide is melted separately at 60 C using a water bath, and then it is soaked into the polymer pellets. The soaking procedure is as follows: The polymer pellets are heated in a glass jar at 60 C for 4 hours. The melted peroxide is then added to the pellets using a syringe and tumble-blended for 5 minutes while the pellets are hot. The jar containing the polymer pellets with peroxide is then placed in an oven at 60 C for a minimum of 3 hours. The peroxide soaked pellets are then used to make about 40 grams of each of the various compositions in a melt-compounding step using a Brabender mixing bowl. The pellets are loaded into the bowl and mixed at 35 rpm, 120 C until molten. The TEMPO scorch inhibitor is then added and further mixed for additional 4 minutes at the same set temperature and speed conditions.

The cross-linking kinetics of the compositions are investigated using an MDR at 150 C, 60 minutes (to simulate melt processing conditions where scorch is not desirable) and at 182 C, 12 minutes (to simulate vulcanization conditions in which rapid and effective crosslinking are desirable). The results are presented in FIG. 2.

In comparison with peroxide sans a TEMPO scorch inhibitor:

1. Allyl TEMPO increases only slightly the scorch time ts1 (time for 1 lb-inch increase in torque) at a temperature of 150 C which is desirable, but also results in a slight decrease in degree of crosslinking (Maximum Torque, MH, minus Minimum Torque, ML.) at 182 C.
2. Amino-TEMPO increases the scorch time at a temperature of 150 C which is desirable, but also decreases the degree of crosslinking at 182 C.
3. Stearyl urethane TEMPO increases significantly both the scorch time ts1 as well as the degree of crosslinking, both of which are desirable cure control properties.
4. 4-hydroxy-TEMPO results in increased scorch time ts1, but at the expense of a significant reduction in the degree of crosslinking.

Although the invention as been described in considerable detail by the preceding examples, this detail is for illustration and is not to be construed as a limitation on the spirit and scope of the invention as it is described in the following claims.

What is claimed is:

1. A crosslinked polymer comprising a scorch-inhibiting amount of a TEMPO scorch inhibitor that is at least one of methyl ether TEMPO, butyl ether TEMPO, hexyl ether TEMPO, allyl ether TEMPO and stearyl urethane TEMPO.

2. The crosslinked polymer of claim 1 in which the scorch inhibitor is soluble in the polymer before the polymer is crosslinked.

3. An article comprising the crosslinked polymer of claim 1.

* * * * *